(12) United States Patent
Giurgiu et al.

(10) Patent No.: US 11,386,068 B2
(45) Date of Patent: Jul. 12, 2022

(54) METHOD, APPARATUS, AND COMPUTER PROGRAM PRODUCT FOR VERIFYING AND/OR UPDATING ROAD MAP GEOMETRY BASED ON RECEIVED PROBE DATA

(71) Applicant: HERE Global B.V., Eindhoven (NL)

(72) Inventors: Gavril Giurgiu, Deerfield, IL (US); Alex Averbuch, Buffalo Grove, IL (US)

(73) Assignee: HERE GLOBAL B.V., Eindhoven (NL)

( * ) Notice: Subject to any disclaimer, the term of this patent is extended or adjusted under 35 U.S.C. 154(b) by 1415 days.

(21) Appl. No.: 15/336,267

(22) Filed: Oct. 27, 2016

(65) Prior Publication Data

US 2018/0121483 A1     May 3, 2018

(51) Int. Cl.
*G06F 16/23* (2019.01)
*G06F 16/29* (2019.01)
*G01C 21/32* (2006.01)

(52) U.S. Cl.
CPC ......... *G06F 16/2365* (2019.01); *G01C 21/32* (2013.01); *G06F 16/23* (2019.01); *G06F 16/29* (2019.01)

(58) Field of Classification Search
CPC ........ G01S 5/021; G01S 1/028; G01S 5/0009; G01S 5/0054; G01S 5/0252;

(Continued)

(56) References Cited

U.S. PATENT DOCUMENTS 6,385,539 B1   5/2002   Wilson et al.
8,725,404 B2   5/2014   Kmiecik et al.
(Continued)

FOREIGN PATENT DOCUMENTS

TW     201231927 A      8/2012
WO   WO2009098154 A1   8/2009
(Continued)

OTHER PUBLICATIONS

Karimi et al. "A Methodology for Predicting Performances of Map-Matching Algorithms." Conference: Web and Wireless Geographical Information Systems, 6th International Symposium, W2GIS 2006, Hong Kong, China, Dec. 4-5, 2006, Proceedings, 12 pages.

(Continued)

*Primary Examiner* — Angelica Ruiz
(74) *Attorney, Agent, or Firm* — Alston & Bird LLP

(57) ABSTRACT

A method is provided for verifying and/or updating map geometry based on a probe data. A method may include: receiving probe data from a plurality of probes within a region, where the probe data includes at least one of heading information and location information for each probe data point; matching the probe data to a link segment to generate map-matched probe data; calculating a difference between the at least one of heading information and location information of the map-matched probe data points and of the link segment; determining a statistical mean of the data; determining an error of the statistical mean of the data; and flagging the link segment for manual review in response to the statistical mean being greater than the error of the statistical mean multiplied by a biasing factor.

26 Claims, 10 Drawing Sheets

(58) Field of Classification Search
CPC ...... G01S 5/0278; G01S 13/86; H04W 64/00; H04W 4/025; H04W 4/029; G06F 3/0481; G06F 3/04842; G06F 3/0488; G06F 3/0685
USPC .......... 707/600–831, 899, 999.001–999.206
See application file for complete search history.

(56) References Cited

U.S. PATENT DOCUMENTS

| | | |
|---|---|---|
| 2002/0082767 A1* | 6/2002 | Mintz ................. G08G 1/01 701/117 |
| 2006/0047423 A1 | 3/2006 | Min |
| 2007/0152804 A1* | 7/2007 | Breed ................ B60N 2/2863 340/435 |
| 2007/0294023 A1* | 12/2007 | Arcot ................. G08G 1/0104 701/117 |
| 2008/0262721 A1 | 10/2008 | Guo et al. |
| 2009/0138497 A1 | 5/2009 | Zavoli et al. |
| 2011/0043377 A1* | 2/2011 | McGrath ........... G08G 1/09675 340/905 |
| 2011/0208424 A1* | 8/2011 | Hirsch ............... G01C 21/165 701/532 |
| 2012/0004845 A1* | 1/2012 | Kmiecik ............. G01C 21/32 701/445 |
| 2012/0116678 A1* | 5/2012 | Witmer ............... G01C 21/32 702/5 |
| 2012/0237088 A1* | 9/2012 | Bekaert .............. G01C 21/26 382/113 |
| 2013/0030690 A1 | 1/2013 | Witmer |
| 2013/0211699 A1* | 8/2013 | Scharmann ......... G01C 21/32 701/117 |
| 2014/0132608 A1 | 5/2014 | Mund et al. |
| 2014/0244164 A1* | 8/2014 | Gale ................... G01C 21/30 701/446 |
| 2015/0170514 A1 | 6/2015 | Stenneth |
| 2015/0356868 A1* | 12/2015 | Cuende Alonso ..... G01C 21/36 382/104 |

FOREIGN PATENT DOCUMENTS

| | | |
|---|---|---|
| WO | WO2010105714 A1 | 9/2010 |
| WO | WO2012089285 A1 | 7/2012 |
| WO | WO2014044784 | 3/2014 |

OTHER PUBLICATIONS

Zhou, J. "Map Matching of GPS-traced Travel Data in a GIS Environment: A Travel/Transportation Study Perspective." AAG annual meeting, Denver, 2005, 43 pages.

Eastern European Search Report for Application No. 17198195.4 dated Apr. 10, 2018, 8 pages.

Convolution—Wikipedia [online] [retrieved Sep. 11, 2019]. Retrieved from the Internet: https://web.archive.org/web/20161024083844/https://en.wikipedia.org/wiki/Convolution. (Oct. 24, 2016) 15 pages.

Fourier transform—Wikipedia [online] [retrieved Sep. 11, 2019]. Retrieved from the Internet: https://web.archive.org/web/20161024211809/https://en.wikipedia.org/wiki/Fourier_transform. (Oct. 24, 2016) 33 pages.

Bootstrapping—Wikipedia [online] [retrieved Sep. 11, 2019]. Retrieved from the Internet: https://web.archive.org/web/20161024200950/https://en.wikipedia.org/wiki/Bootstrapping. (Oct. 24, 2019) 7 pages.

ITS International—Inertial Sensors Dramatically Improve GNSS for ITS applications [online] [retrieved Nov. 30, 2014]. Retrieved from the Internet: itsinternational.com/categories/.../inertial-sensors/dramatically-improve-gnss-fo-its-applications/ (dated Aug. 2011) 4 pages.

* cited by examiner

METHOD, APPARATUS, AND COMPUTER PROGRAM PRODUCT FOR VERIFYING AND/OR UPDATING ROAD MAP GEOMETRY BASED ON RECEIVED PROBE DATA

TECHNOLOGICAL FIELD

An example embodiment of the present invention relates to map generation and revision and, more particularly, to revising map geometry based on probe data collected including automatically and semi-automatically correcting map geometry anomalies.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. However, map features such as roadways and routes along roadways change with relative frequency and mapping services may struggle to keep up with the map feature changes considering there are millions of miles of roads and thousands of road projects altering traffic routes on a constant basis. Further, given the vast number of road segments in roadway networks for cities, countries, and continents, digital map geometries may sometimes be erroneous or contain anomalies. Correcting digital map geometry anomalies with respect to road segment location can be a time consuming and costly undertaking.

BRIEF SUMMARY

A method, apparatus, and computer program product are provided in accordance with an example embodiment for gathering probe data and using the gathered data to verify and update digital map data. According to an example embodiment described herein, a map services provider system may be provided. The system may include a communications interface configured to receive probe data points from a plurality of probes, wherein the probe data includes at least one of heading information and location information for each probe data point. The system may also include a processor configured to: match the probe data to a link segment to generate map-matched probe data; calculate a difference between the at least one of heading information and location information of the map-matched probe data points and of the link segment; determine a statistical mean of the difference between the at least one of heading information and location information of the map-matched probe data points and the link segment; determine an error of the statistical mean of the difference between the at least one of the heading information and location information of the map-matched data points and the link segment; and flag the link segment for manual review in response to the statistical mean of the difference between the at least one of heading information and location information of the map matched probe data points and the link segment being greater than the error of the statistical mean multiplied by a biasing factor.

According to some embodiments, the probe data includes location information for each probe data point. Causing the processor to calculate a difference between the at least one of heading information and location information of the map-matched probe data points and of the link segment may include causing the processor to calculate a distance between the location information for each probe data point and the link segment. Causing the processor to determine a statistical mean of the difference between the at least one of heading information and location information of the map-matched probe data points and the link segment includes causing the processor to determine a statistical mean of the distance between the map-matched probe data points and the link segment.

The error of the statistical mean may, according to some embodiments, be calculated by: determining the standard deviation of the difference between the at least one of heading information and location information of the map-matched probe data points and the link segment; and dividing the standard deviation by a square root of a number of probe data points map-matched to the link segment. According to some embodiments, the processor may optionally be configured to: add the link segment to a queue for review in response to the link segment being flagged for manual review; provide for presentation of the digital map data associated with the link segment; provide for presentation of map-matched probe data matched to the link segment; and provide for updating the digital map data associated with the link segment to reflect the map-matched probe data in response to a user input.

According to some embodiments, the difference between the at least one of heading information and location information of the map-matched probe data and the link segment includes a first component and a second component. The first component may include a location accuracy component, while the second component may include a true difference between map data associated with the link segment and a true location of a road segment associated with the link segment. The processor may be configured to: calculate a first probability density of a combination of the first component and the second component; calculate a second probability density of the first component; and perform a Fourier analysis of the first probability density and the second probability density to obtain a probability density of the second component. Calculating the probability density of the combination of the first component and the second component may include calculating a probability density of the difference between the at least one of heading information and location information of the map-matched probe data points and of the link segment. Calculating the second probability density may include calculating a probability density based on measurement errors of the probe data points.

An example embodiment may provide an apparatus including at least one processor and at least one memory including computer program code. The at least one memory and the computer program code may be configured to, with the processor, cause the apparatus to at least: receive probe data from a plurality of probes within a region, where the probe data comprises at least one of heading information and location information for each probe data point; match the probe data to a link segment to generate map-matched probe data; calculate a difference between the at least one of heading information and location information of the map-matched probe data points and the link segment; determine a statistical mean of the difference between the at least one of heading information and location information of the map-matched probe data points and the link segment; determine an error of the statistical mean of the difference between the at least one of heading information and location information of the map-matched probe data points and the link segment; and flag the link segment for manual review in response to the statistical mean of the difference between the at least one of heading information and location information of the map-matched probe data points and the link segment being greater than the error of the statistical mean multiplied by a biasing factor.

According to some embodiments, the probe data includes location information for each probe data point, and causing the processor to calculate a difference between the at least one of heading information and location information of the map-matched probe data points and the link segment includes causing the processor to calculate a distance between the location information for each probe data point and the link segment. Causing the apparatus to determine a statistical mean of the difference between the at least one of heading information and location information of the map-matched probe data points and the link segment includes causing the apparatus to determine a statistical mean of the distance between the map-matched probe data points and the link segment.

An apparatus of an example embodiment may calculate the error of the statistical mean by: determining the standard deviation of the difference between the at least one of heading information and location information of the map-matched probe data points and the link segment; and dividing the standard deviation by a square root of a number of probe data points map-matched to the link segment. The apparatus may optionally be configured to: add the link segment to a queue for review in response to the link segment being flagged for manual review; provide for presentation of digital map data associated with the link segment; provide for presentation of map-matched probe data matched to the link segment; and provide for updating the digital map data associated with the link segment to reflect the map-matched probe data in response to a user input.

According to some embodiments, the difference between the at least one of heading information and location information of the map-matched probe data points and the link segment includes a first component and a second component. The first component may be a location accuracy component, while the second component may include a true difference between the map data associated with the link segment and a true location of a road segment associated with the link segment. The apparatus may be configured to: calculate a first probability density of a combination of the first component and the second component; calculate a second probability density of the first component; and perform a Fourier analysis of the first probability density and the second probability density to obtain the probability density of the second component. The apparatus may be configured to calculate the first probability density based on the difference between the at least one of heading information and location information of the map-matched probe data points and of the link segment, and the processor may be configured to calculate the second probability density based on measurement errors of the probe data points.

An example embodiment of the present invention may provide a method including: receiving probe data from a plurality of probes within a region, where the probe data includes at least one of heading information and location information for each probe data point; matching the probe data to a link segment to generate map-matched probe data; calculating a difference between the at least one of heading information and location information of the map-matched probe data points and of the link segment; determining a statistical mean of the difference between the at least one of heading information and location information of the map-matched probe data points and the link segment; determining an error of the statistical mean of the difference between the at least one of heading information and location information of the map-matched probe data points and the link segment; and flagging the link segment for manual review in response to the statistical mean of the difference between the at least one of heading information and location information of the map-matched probe data points and the link segment being greater than the error of the statistical mean multiplied by a biasing factor.

According to some embodiments, the probe data includes location information for each probe data point, and calculating a difference between the at least one of heading information and location information of the map-matched probe data points and the link segment includes calculating a distance between the location information for each probe data point and the link segment. Determining a statistical mean of the difference between the at least one of heading information and location information of the map-matched probe data points and the link segment may include determining a statistical mean of the distance between the map-matched probe data points and the link segment. The error of the statistical mean may be calculated by: determining the standard deviation of the difference between the at least one of heading information and location information of the map-matched probe data points and the link segment; and dividing the standard deviation by a square root of a number of probe data points map-matched to the link segment.

Methods may include: adding the link segment to a queue for review in response to the link segment being flagged for manual review; providing for presentation of digital map data associated with the link segment; providing for presentation of map-matched probe data matched to the link segment; and updating the digital map data associated with the link segment to reflect the map-matched probe data in response to a user input.

According to some embodiments, the difference between at least one of heading information and location information of the map-matched probe data points and the link segment includes a first component and a second component. The first component may be a location accuracy component, while the second component may be a true difference between map data associated with the link segment and a true location of a road segment associated with the link segment. Methods may include: calculating a first probability density of a combination of the first component and the second component; calculating a second probability density of the first component; and performing a Fourier analysis of the first probability density and the second probability density to obtain the probability density of the second component. Calculating the probability density of a combination of the first component and the second component may include calculating a probability density of the difference between the at least one of heading information and location information of the map-matched probe data points and of the link segment, where calculating the second probability density includes calculating a probability density based on measurement errors of the probe data points.

An example embodiment of the present invention may provide a computer program product including at least one non-transitory computer-readable storage medium having computer-executable program code portions stored therein. The computer-executable program code portions include program code instructions configured to: receive probe data from a plurality of probes within a region, where the probe data includes at least one of heading information and location information for each probe data point; match the probe data to a link segment to generate map-matched probe data; calculate a difference between the at least one of heading information and location information of the map-matched probe data points and the link segment; determine a statistical mean of the difference between the at least one of heading information and location information of the map-matched probe data points and the link segment; determine an error of the statistical mean of the difference between the at least one of heading information and location information of the map-matched probe data points and the link segment; and flag the link segment for manual review in response to the statistical mean of the difference between the at least one of heading information and location information of the map-matched probe data points and the link segment being greater than the error of the statistical mean multiplied by a biasing factor.

According to some embodiments, the probe data may include location information for each probe data point. Causing the processor to calculate a difference between the at least one of heading information and location information of the map-matched probe data points and of the link segment may include causing the processor to calculate a distance between the location information for each probe data point and the link segment. The program code instructions to determine a statistical mean of the difference between the at least one of heading information and location information of the map-matched probe data points and the link segment include program code instructions to cause the processor to determine a statistical mean of the distance between the map-matched probe data points and the link segment.

Computer program products of some embodiments to calculate the error of the statistical mean may include program code instructions to: determine the standard deviation of the difference between the at least one of heading information and location information of the map-matched probe data points and the link segment; and divide the standard deviation by a square root of a number of probe data points map-matched to the link segment. The program code instructions may include instructions to: add the link segment to a queue for review in response to the link segment being flagged for manual review; provide for presentation of digital map data associated with the link segment; provide for presentation of map-matched probe data matched to the link segment; and provide for updating the digital map data associated with the link segment to reflect the map-matched probe data in response to a user input.

In another embodiment, an apparatus is provided that includes means for receiving probe data from a plurality of probes within a region, where the probe data includes at least one of heading information and location information for each probe data point. The apparatus also includes means for matching the probe data to a link segment to generate map-matched probe data and means for calculating a difference between the at least one of heading information and location information of the map-matched probe data points and of the link segment. The apparatus further includes means for determining a statistical mean of the difference between the at least one of heading information and location information of the map-matched probe data points and the link segment and means for determining an error of the statistical mean of the difference between the at least one of heading information and location information of the map-matched probe data points and the link segment. Further, the apparatus includes means for flagging the link segment for manual review in response to the statistical mean of the difference between the at least one of heading information and location information of the map-matched probe data points and the link segment being greater than the error of the statistical mean multiplied by a biasing factor.

BRIEF DESCRIPTION OF THE DRAWINGS

Figure 1:
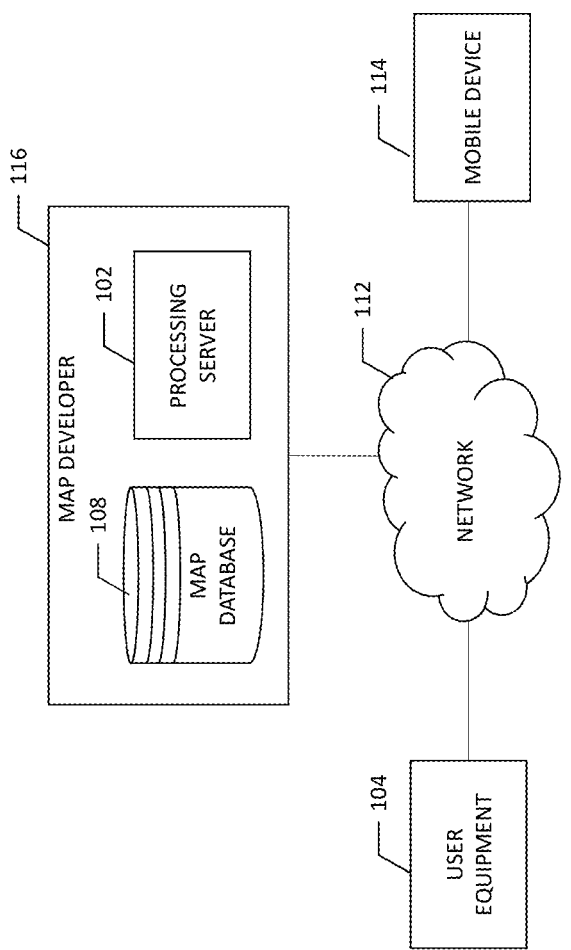
Figure 2:
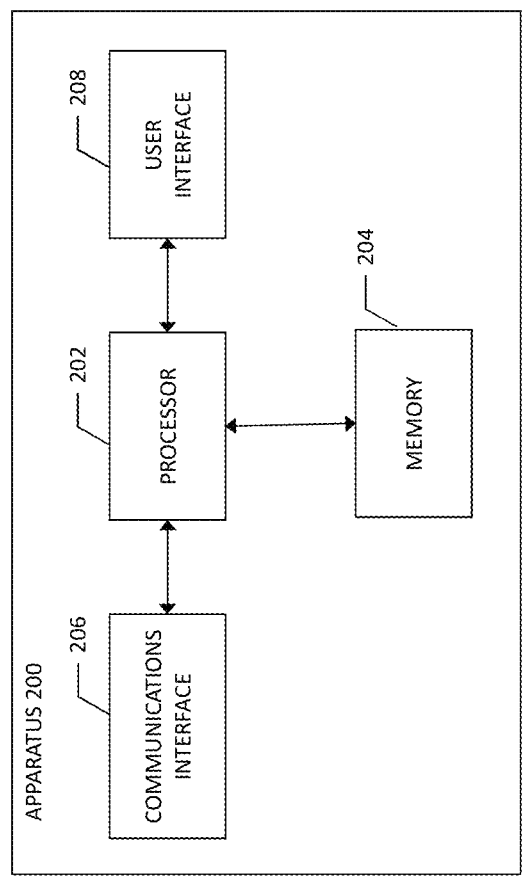
Figure 3:
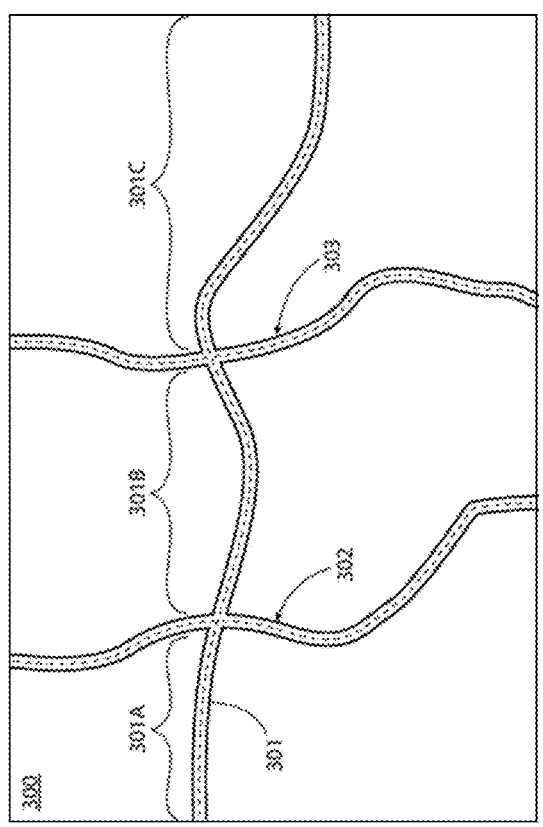
Figure 4:
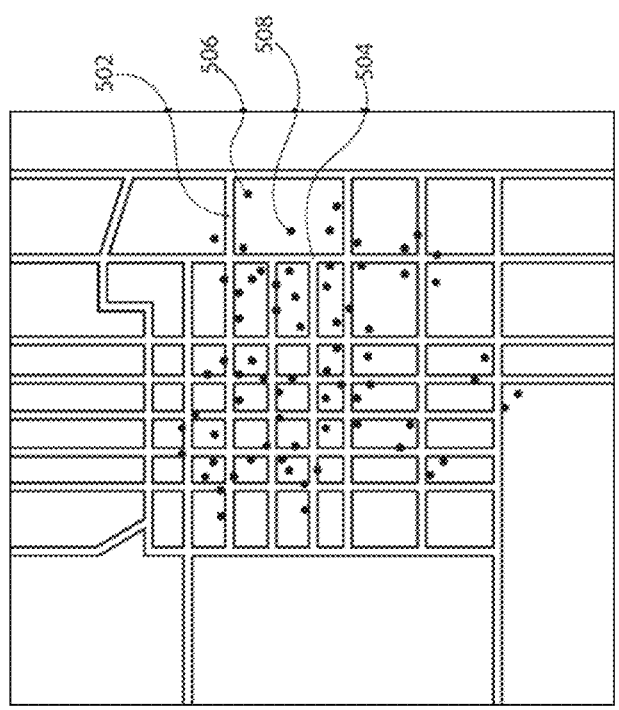
Figure 5:
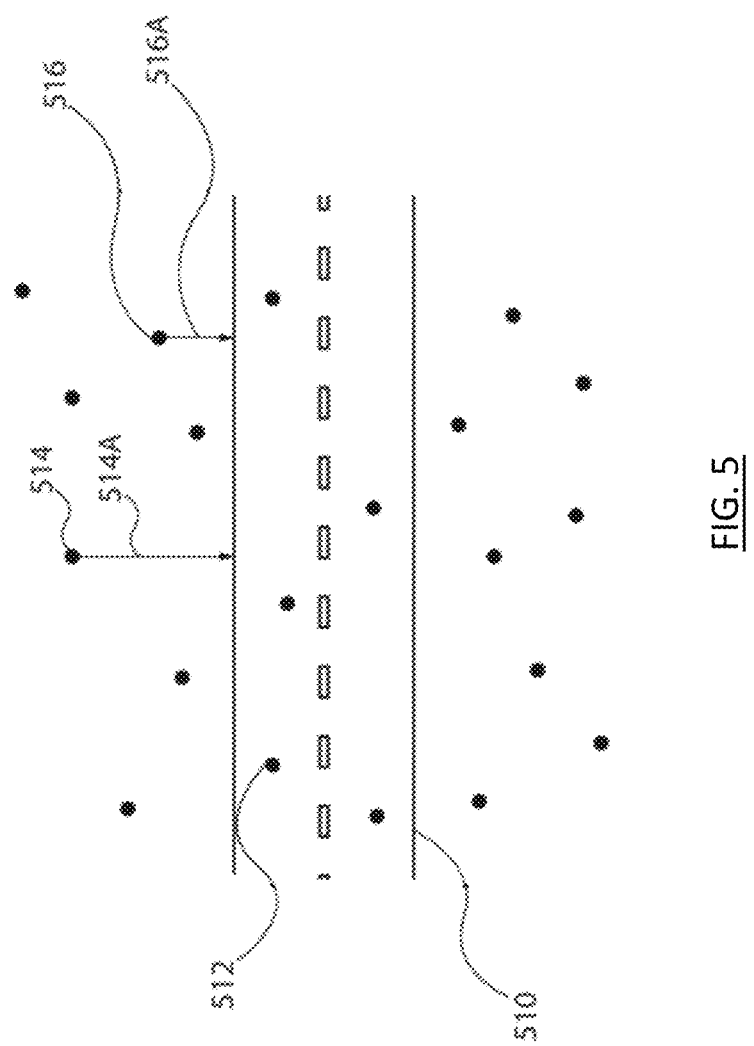
Figure 6:
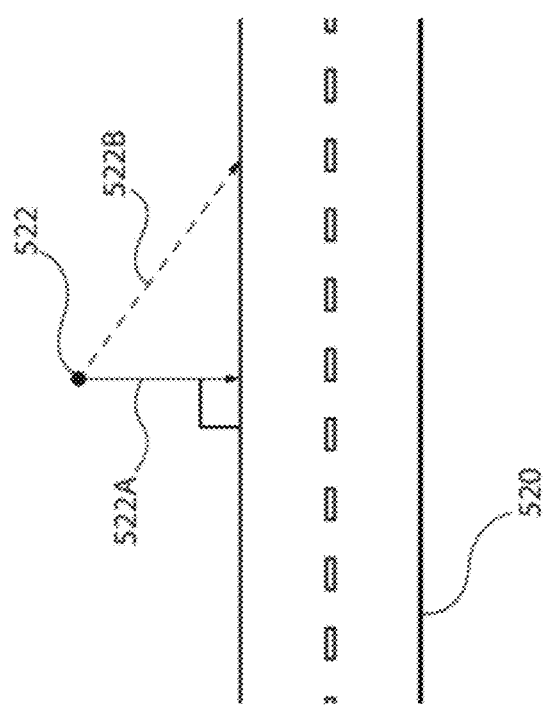
Figure 7:
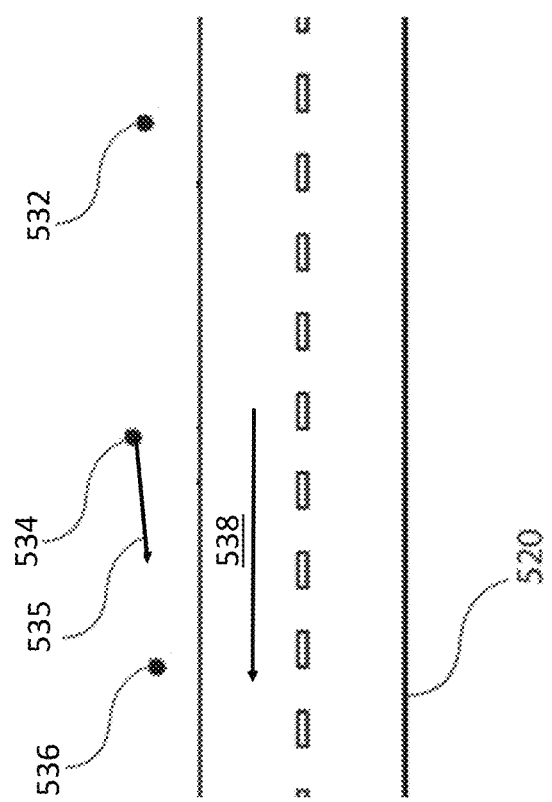
Figure 8:
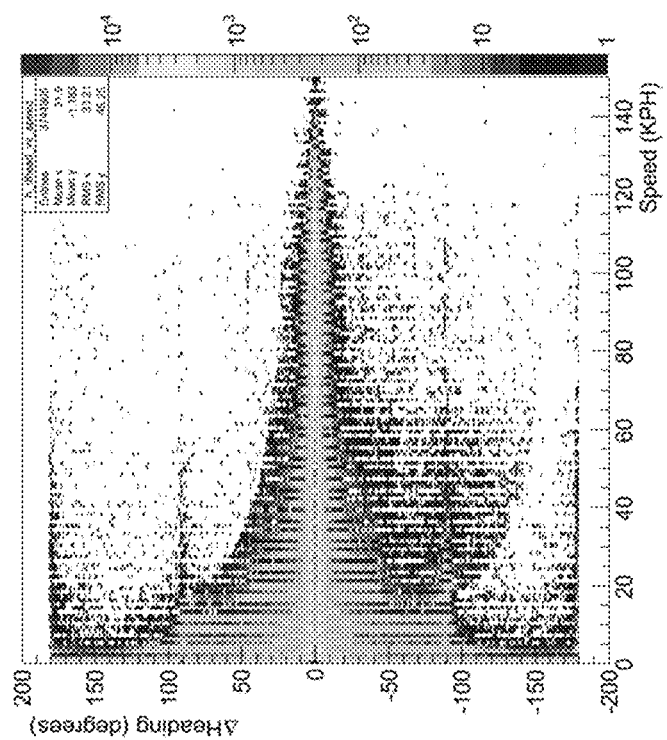
Figure 9:
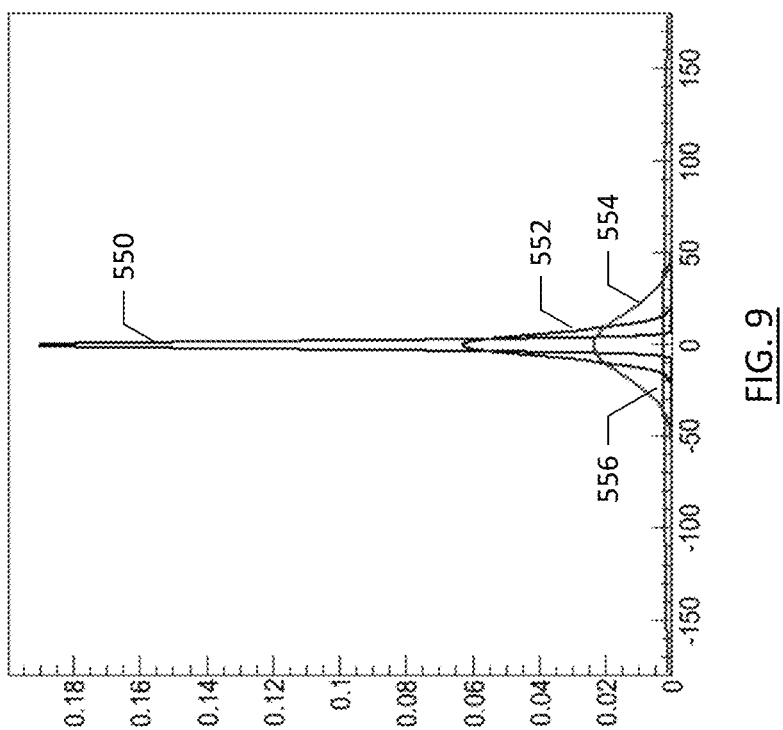
Figure 10:
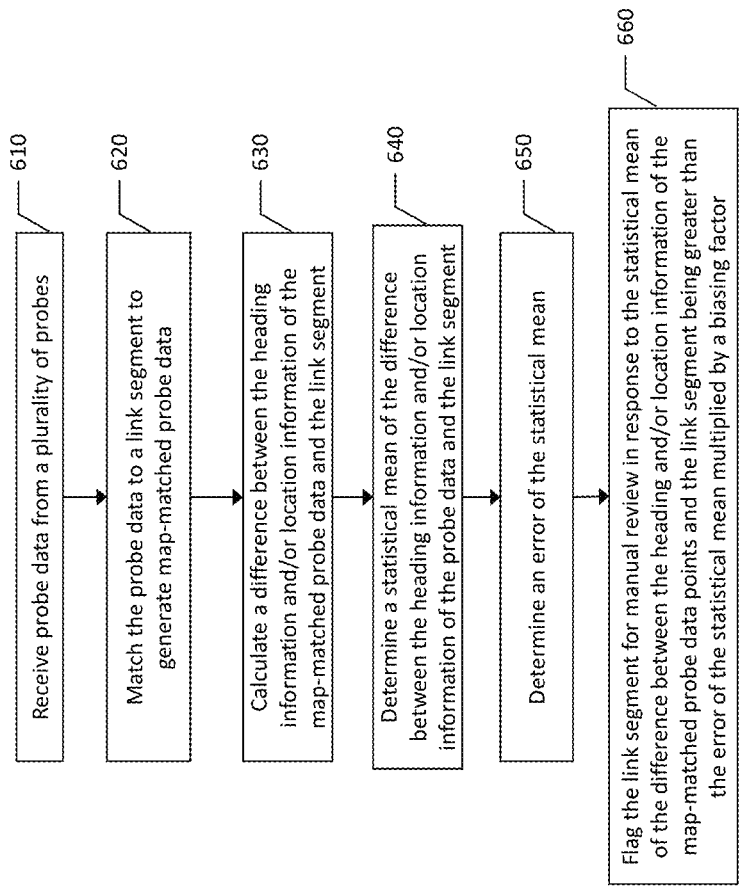

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for verifying and updating map geometry based on a received probe data in accordance with an example embodiment of the present invention;

FIG. 3 illustrates a depiction of a digital map including a plurality of link segments representing road segments in the digital map according to an example embodiment of the present invention;

FIG. 4 illustrates a digital map including a plurality of probe data points overlaid thereon for map-matching to link segments of the digital map according to an example embodiment of the present invention;

FIG. 5 illustrates a link segment representing a portion of a road and a plurality of probe data points map-matched to the link segment according to an example embodiment of the present invention;

FIG. 6 illustrates a link segment representing a portion of a road and a probe data point map-matched to the link segment and being a distance from the link segment according to an example embodiment of the present invention;

FIG. 7 illustrates a link segment representing a portion of a road and probe data points including heading information map-matched to the link segment according to an example embodiment of the present invention;

FIG. 8 depicts a histogram depicting the heading information gathered from a plurality of probes and map-matched to a link segment according to an example embodiment of the present invention;

FIG. 9 illustrates a series of probability density functions associated with speed-dependent heading data illustrated in FIG. 8 according to an example embodiment of the present invention; and FIG. 10 is a flowchart of a method for verifying and updating map geometry based on collected probe data using statistical analysis according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for verifying and/or updating map geometry based on probe data received from a plurality of probes. FIG. 1 illustrates a communication diagram of an example embodiment of a system for implementing example embodiments described herein. The illustrated embodiment of FIG. 1 includes a map developer system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map developer 116 may include computer systems and networks of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map developer 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer in association with a services platform. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. While certain example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, an example embodiment may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for revising map geometry based on probe data received over two different periods of time. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by processing server 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an example embodiment of the present invention on a single "system on a chip." As such, in some cases, a chip or chipset may constitute a means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

An example embodiment of the present invention may provide a mechanism for verifying and/or updating map information (e.g., stored in map database 108) using probe data (e.g., from mobile device 114) from a plurality of vehicles traveling along one or more roadways in a particular geographic region. Map information, such as paths of roadways, direction of traffic on said roadways, intersections, and the like may be stored, for example, in map database 108. As roadway infrastructure is subject to deterioration over time, road construction on existing roadways is an inevitable event that will alter roadways at least temporarily. Further, increases in population and vehicular traffic result in the need for new or expanded roadways, while other roadways may be removed or replaced. The term "roadways," as used herein, may refer to any path a vehicle may take in moving from one place to another. Roadways may be paved, improved roadways, gravel roadways, dirt trails, or the like, such that roadways does not imply that the mapped roads are necessarily recognized as county, state, or federally maintained roads, and may include private roadways such as access roads, neighborhood streets, and the like. As these roadways may change over the course of time, map information related to these roadways may require revision to keep up with the changes to the roadway paths.

Certain example embodiments described herein provide a mechanism to verify and/or update roadway geometry using statistical analysis of probe data to identify potential errors in digital maps. Statistical analysis is performed on the probe data relative to the representation of the road structure in the digital map to determine the likelihood of the digital map including erroneous information.

Oftentimes, portions of a road, a highway, a street, and/or the like may be distinct. For example, a highway may be marked with distance markers, a street may be divided by intersections, and/or the like. A portion of a route, a lane, a road, a highway, a street, a trail, a thoroughfare, and/or the like may be referred to as a link segment. For example, a link segment may be a portion of a road between two intersections, a route between two cities, a portion of a street over a predefined distance (e.g. a mile, a kilometer, 100 meters, and/or the like), and/or the like. In at least one example embodiment, a link segment comprises at least a portion of a route, a lane, a road, a highway, a street, a trail, a thoroughfare, and/or the like.

The example of FIG. 3 illustrates a representation of a portion of a map 300 comprising roads 301, 302, and 303. Roads 301, 302 and 303 may each comprise one or more link segments. It can be seen in the example of FIG. 3 that road 301 is intersected by roads 302 and 303. In this manner, road 301 may be subdivided into link segments 301A, 301B, and 301C. Even though the example of FIG. 3 illustrates particular link segments of a road being defined by intersections along that road, it should be understood that any portion of a route, a lane, a road, a highway, a street, a trail, a thoroughfare, and/or the like may be a link segment.

For purposes of verifying and/or updating road map geometry, it may be desirable to identify a position of a particular apparatus or probe. Such a position may also be used to support various navigation operations, routing functionality, assisted-driving technology, and/or the like. In such circumstances, an apparatus may use the Global Positioning System (GPS), the Global Navigation Satellite System (GLONASS), the Galileo satellite system, any satellite-based positioning system, and/or the like. GPS is a space-based satellite navigation system that provides location and time information in all weather conditions, anywhere on or near the earth, and where there is an unobstructed line of sight to four or more GPS satellites. Each GPS satellite continually broadcasts a signal that includes various GPS data. Such GPS data may include, for example, a pseudo-random code that is known to the receiver. By time-aligning a receiver-generated version and the receiver-measured version of the code, the time of arrival (TOA) of a defined point in the code sequence, called an epoch, can be found in the receiver clock time scale. Additionally, the GPS data may include the time of transmission (TOT) of the code epoch and the satellite position at that time. An apparatus, such as a GPS receiver, measures the TOAs, according to its own clock, of four satellite signals. Based on the TOAs and the TOTs, the apparatus calculates four or more time of flight (TOF) values. The apparatus may then compute its three-dimensional position and clock deviation from the four or more TOFs. The three-dimensional position is often a set of three-dimensional Cartesian coordinates with origin at the earth's center. To facilitate use of this three-dimensional position, the earth-centered solution location may be converted to latitude, longitude, and altitude.

In at least one example embodiment, an apparatus receives GPS data from a plurality of GPS satellites. In such an example embodiment, the apparatus may subsequently determine a measured satellite pseudo-range for each GPS satellite of the plurality of GPS satellites based, at least in part, on the GPS data. The measured satellite pseudo-range of a GPS satellite is the pseudo distance between the GPS satellite and the apparatus, such as a GPS receiver. This distance is referred to as a pseudo distance since the distance is not precise and is, instead, an estimation that is based, at least in part, on the TOF multiplied by the speed of light. To determine its position, an apparatus may determine the pseudo-ranges to at least four GPS satellites, as well as the positions of the at least four GPS satellites at the time of transmission. A position of a GPS satellite may be calculated for any point in time based, at least in part, on the orbital parameters of the GPS satellite. The pseudo-range for each GPS satellite of the plurality of GPS satellites may be calculated by multiplying the speed of light by the time the signal has taken from each GPS satellite to reach the apparatus. As there are accuracy errors in the time measured, the term pseudo-range is used, rather than ranges, for such distances. As such, in such an example embodiment, the measured satellite pseudo-range for a particular GPS satellite of the plurality of GPS satellites may be a calculated distance between the particular GPS satellite and the apparatus. A calculated distance between a GPS satellite and an apparatus may be referred to as a navigational signal measurement.

Even though the aforementioned example embodiments relate to GPS, GPS data, GPS satellites, and/or the like, it should be understood that any satellite-based positioning system may be used. For example, any data from any satellite-based positioning system and any satellites associated with any satellite-based positioning system may be used. For example, the apparatus may receive GLONASS data from at least one GLONASS satellite, may receive Galileo data from at least one Galileo satellite, and/or the like. In such examples, the apparatus may determine a measured satellite pseudo-range for each GLONASS satellite of a plurality of GLONASS satellites, for each Galileo satellite of the plurality of Galileo satellites, and/or the like.

The manner in which a position is determined by way of GPS data is prone to errors due to the heavy reliance on accurate time keeping. As such, even the most minute discrepancies in time synchronization amongst GPS satellites and apparatuses, such as GPS receivers, can result in very large positioning errors. For example, an apparatus may use a quartz oscillator to maintain time. The accuracy of such a quartz-based clock, in general, may be worse than one part in a million. If such a clock has not been corrected for a week, a measured satellite pseudo-range based on that clock's time may result in a measured satellite pseudo-range that places the apparatus not on the surface of Earth, but outside the Moon's orbit. Even if the clock is corrected, a second later the clock may again be unusable for accurate calculation of a measured satellite pseudo-range because, after a second, the error may result in determination of a position that is erroneous by hundreds of meters.

In this manner, a measured satellite pseudo-range may fail to accurately identify the distance between a satellite and an apparatus for which position is sought. Such a discrepancy may be based, at least in part, on inaccurate time synchronization between GPS satellites, inaccurate time synchronization between GPS satellites and the apparatus, atmospheric variations, line of sight interference from buildings, multipath errors caused by indirect receipt of GPS data, and/or the like.

FIGS. 4-7 are diagrams illustrating probe data according to at least one example embodiment. The examples of FIGS. 4-7 are merely examples and do not limit the scope of the claims. For example, the amount of probe data may vary, the type of probe data may vary, the distribution of probe data may vary, the format of the probe data may vary, the representation of the probe data may vary, and/or the like.

Real time data of vehicular traffic is increasingly being collected, aggregated, processed, analyzed, stored, and/or the like. Such real time data may include information indicative of the speed of a vehicle, the location of a vehicle, the time the data was collected, and/or the like. For example, a particular data point within a set of real time data may indicate the speed of a vehicle at a particular location during a particular time period. Data points within a set of real time data may be referred to as probe data. Such probe data may, for example, be collected to create speed-vs-time curves, historical traffic models, to perform real time traffic analysis, to create forward-looking traffic predictions, and/or the like. Probe data may be collected from vehicle-mounted sensors, GPS-enabled devices (e.g. smart phones), road sensors, traffic cameras, traffic reports, witnesses, and/or the like. Probe data may be centrally collected and distributed, broadcast, and/or the like to various receivers, subscribers, and/or the like (e.g. via a wireless network), such as to mobile navigation systems, portable navigation systems, news organizations, electronic road signs, and/or the like. Alternatively or additionally, probe data may be collected by an apparatus, such as a mobile navigation system, a portable navigation system, a traffic reporting system, and/or the like for use by the apparatus. For example, a GPS system installed in a vehicle may record the position and speed of the vehicle at particular intervals (e.g. once every second) for use by the vehicle, the GPS system, and/or the like, road sensors may record the speed and time of vehicles as they pass a particular position, and transmit the data over a cellular data connection for reporting to a subscription service, and/or the like. It will be appreciated that probe data collected by vehicle mounted sensors, road sensors, GPS-enabled devices, and/or the like may be distributed via wireless peer-to-peer or mesh-based networks, e.g. the data is passed from a source and then from vehicle to vehicle, each navigation system within a vehicle being both a consumer of the data and a repeater thereof. For example, probe data collected from vehicle-mounted sensors may be shared between vehicles by way of a vehicular ad hoc network, similar as described in the Institute of Electrical and Electronics Engineers (IEEE) 802.11 and 802.16 standards.

When probe data is received (e.g. from a service provider, from a sensor, and/or the like), the probe data may not be associated with a particular link segment. In circumstances where received probe data is not associated with a link segment, it may be desirable to match probe data to link segments on a map. For instance, the probe data may not identify a reference to a particular link segment, but use of the probe data for analysis, traffic reporting, and/or the like may be facilitated by associating the probe data with a particular link segment. For example, creation of a historical traffic model may be facilitated by associating probe data with a particular link segment. A historical traffic model may refer to a model of traffic behavior over time based, at least in part, on historical traffic data. For example, a historical traffic model may model the speed of a particular link segment at various times of the day based, at least in part, on data collected at similar times of day over an extended period of time, may model the location of a particular vehicle as the vehicle travels along a route based, at least in part, on data collected while the vehicle travels along the route, and/or the like. Probe data may be matched to a link segment on a map using a number of known methods. For example, a computer program may be used that associates location information comprised by particular probe data with particular link segments. For instance, probe data may include a position received from a GPS receiver, and the GPS coordinates may be utilized by the computer program to determine a corresponding link segment. In another example, probe data may be manually associated with link segments, though a manual approach may be labor intensive, insufficiently fast, and/or the like. It should be understood that a link segment may be unidirectional (e.g. traffic flows in one direction), bi-directional (e.g. traffic flows in two directions), comprise multiple lanes, and/or the like. In circumstances where the link segment is bi-directional and/or comprises multiple lanes, it may be desirable to match probe data to a link segment according to the direction of traffic flow, the lane associated with the probe data, and/or the like. For example, if the link segment is bi-directional, it may be desirable to only match probe data to the link segment associated with traffic flow in one direction, to divide the link segment into multiple link segments (e.g. each flow direction is a different link segment, each lane of a road is a single link segment, etc.), and/or the like. In this manner, probe data matched to the link segment may be limited to probe data that is indicative of the same direction of travel, indicative of probe data associated with a single lane of a road, and/or the like.

FIG. 4 is a diagram illustrating a graphical representation of probe data according to at least one example embodiment. The example of FIG. 4 depicts a map of various roads and thoroughfares comprising link segments, such as link segment 502 and link segment 504 overlaid with locations associated with navigational signal measurements, such as locations 506 and 508. In this respect, locations 506 and 508 may represent probe data. In some circumstances, probe data may be associated with a location that fails to comprise a link segment due to inaccuracies in the probe data. For example, the probe data may be associated with a location adjacent to a link segment, such as the location of a building, despite the probe data being recorded from the location of the link segment. For example, location 506 may represent a location indicated by a navigational signal measurement comprising a measurement error from a point along link segment 502, and location 508 may represent a location indicated by a navigational signal measurement comprising a measurement error from a point along link segment 504. As such, location 506 may be matched to link segment 502, and location 508 may be matched to link segment 504. Similarly, other locations depicted in FIG. 4 may be matched to other link segments. Even though the example of FIG. 4 represents probe data graphically, probe data may be represented in other manners. For example, probe data may be a set of geographical coordinates, coded information, text, and/or the like.

As previously described, in some circumstances probe data may be matched to a link segment. In some circumstances, it may be desirable to aggregate probe data matched to a particular link segment into a set. For example, it may be desirable to compare the attributes of individual data points indicated by probe data taken at different times, measured at different positions, and/or the like along a link segment. For example, it may be desirable to measure the difference in probe data points to detect errors, calculate averages, and/or the like for use in a traffic model, to refine navigational data, and/or the like. In at least one example embodiment, an apparatus receives probe data indicative of a set of navigational signal measurements that is matched to a link segment.

FIG. 5 is a diagram illustrating a graphical representation of probe data according to at least one example embodiment. The example of FIG. 5 depicts link segment 510 overlaid with locations associated with navigational signal measurements, such as locations 512, 514, and 516. In this respect locations 512, 514, and 516 may represent probe data. For example, location 514 may represent a location indicated by a navigational signal measurement from a point along link segment 510, and location 516 may represent a different location indicated by a different navigational signal measurement from a point along link segment 510. As such, locations 512, 514, and 516 may be matched to link segment 510. Similarly, other locations depicted in FIG. 5 may be matched to link segment 510. In this manner, the locations depicted in FIG. 5 may represent a set of navigational signal measurements that is matched to link segment 510.

As previously described, a navigational signal measurement may be associated with a measurement error. For instance, GPS signals may be affected by multipath issues, where the radio signals reflect off surrounding terrain, such as buildings, urban canyons, canyon walls, hard ground, and/or the like. For example, it can be seen that location 512 of FIG. 5 lies on a position over link segment 510, while location 514 is a distance 514A away from a side of link segment 510, and location 516 is a distance 516A away from a side of link segment 510. Distances 514A and 516A may represent measurement errors from navigational signal measurements associated with locations 514 and 516. For example, probe data may be received from a navigational apparatus that indicates locations 514 and/or 516 while the navigational apparatus is located at a position overlying link segment 510. In circumstances such as these, it may be desirable to determine a set of measurement errors. For example, the measurement errors may be compared, averaged, normalized, and/or the like. Such operations may be used to compensate for the measurement errors, to improve navigation, and/or the like. In at least one example embodiment, an apparatus determines a set of measurement errors such that each measurement error of the set of measurement errors is a difference between a location indicated by the link segment and a location indicated by a navigational signal measurement of the set of navigational signal measurements. For example, an apparatus may determine a set of measurement errors that indicate distances 514A and 516A as the difference between the location of link segment 510 and locations 514 and 516.

In some circumstances, a location associated with probe data may have a distance between the location and the link segment that is perpendicular to a link segment. For example, a link segment may run in a substantially straight direction. FIG. 6 is a diagram illustrating a graphical representation of probe data according to at least one example embodiment. The example of FIG. 6 depicts link segment 520 and location 522. It can be seen that location 522 is adjacent to link segment 520. In this respect, location 522 may represent probe data. For example, location 522 may represent a location indicated by a navigational signal measurement from a point along link segment 520. As such, location 522 may be matched to link segment 520. It can be seen in the example of FIG. 6 that link segment 520 runs in a generally straight direction. Various distances can be measured between location 522 and link segment 520. For example, FIG. 6 depicts distance 522A between location 522 and link segment 520, and distance 522B between location 522 and link segment 520. It can be seen that in the example of FIG. 6, distance 522A is perpendicular to link segment 520, and that distance 522B fails to be perpendicular to link segment 520. It can also be seen that in the example of FIG. 6, distance 522A is a shorter distance than distance 522B.

It may be desirable to identify a location indicated by a link segment to be a location along the link segment from which the location indicated by the navigational signal measurement is perpendicular. For example, if the navigational signal measurement system has an error similar as previously described, the location along the link segment from which the location indicated by the navigational signal measurement is perpendicular may represent a best estimate of a navigational signal measurement lacking the error. In at least one example embodiment, an apparatus of an example embodiment identifies the location indicated by a link segment to be a location along the link segment from which the location indicated by a navigational signal measurement is perpendicular. For example, the apparatus of this example embodiment may identify a location indicated by link segment 520 of FIG. 6 to be the location along link segment 530 that is perpendicular to a navigational signal measurement associated with location 522. In at least one example embodiment, the difference between the link segment location and the location indicated by the navigational signal measurement is based, at least in part, on a perpendicular distance from the link segment to the location indicated by the navigational signal measurement. For example, a difference between a link segment location and the location indicated by a navigational signal measurement may be based on distance 522A of FIG. 6. In at least one example the difference between a link segment location and a location indicated by the navigational signal measurement is the perpendicular distance from the link segment to the location indicated by the navigational signal measurement.

While the above-described embodiments are directed primarily to determining a "location" relative to a link segment, such as location 522 relative to link segment 520, certain embodiments may similarly determine a heading of a probe data point relative to the link segment. The heading may be determined based on a series of probe data points, where a series is a time-ordered sequence of probe data points generated by a single probe providing an indication of direction of travel based on the time-stamped probe data points each having a location. The heading associated with each probe data point may be determined based on one or more probe data points from the same probe adjacent to the probe data point for which heading is determined. In some instances, interpolation of heading may be generated based on the sequence of probe data points.

FIG. 7 illustrates an example embodiment of the heading of a probe data point as established based on probe data points from a single probe. As shown, a series of probe data points 532, 534, and 536, each from the same probe, have been gathered as the apparatus (e.g., a vehicle) travels along link segment 520. The heading of the link segment 520 in the direction of travel of the probe is shown as arrow 538. The heading of probe data point 534 may be established based on the next probe data point in the sequence, 536. The heading 535 of probe data point 534 is illustrated at an angle relative to the heading of the link segment 538. While the difference between the position of a probe data point and a link segment may be established based on a distance between the two (e.g., the perpendicular distance 522A of FIG. 6 between location 522 and link segment 520), the difference between the heading 535 of a probe data point 534 and a link segment 520 may be determined based on an angular difference between the heading of the probe data point 535 and the heading of the link segment 538.

When the location 522 of a probe data point and the map-matched link segment 520 location differ, as illustrated by perpendicular distance 522A in FIG. 6, or when the heading 535 of a probe data point 534 and the map-matched link segment 520 heading 538 differ, it signifies one of three possibilities: A) the location data or heading data from the probe data point is erroneous; B) the location or heading of the link segment is erroneous; or C) both the location data or heading data from the probe data point and the location or heading of the link segment are erroneous. While data from one probe in the form of one or more probe data points may not be sufficiently reliable to make a determination of any of the aforementioned errors, the collection of a statistically significant population of probe data point information may provide sufficient detail to determine if any of the location or heading data is erroneous, whether it is probe data or link segment data.

An example embodiment of the present invention provides for automatic or semi-automatic identification of potential errors in digital maps. Methods described herein determine how well probe data, such as GPS probe data, match the map representation (e.g., digital map data) of a road structure of a link segment that is map-matched to the probe data. If the digital map data is accurate, the probe data will match well on average. If the digital map data is not accurate, then on average the probe data will exhibit poor map matching quality metrics.

As described above, the most fundamental map matching quality metrics are the distance between the probe data point location and the link segment location, and the angular difference between the probe data point heading and the link segment heading. Generally, map link segments may be periodically analyzed and those identified as having low map matching quality metrics may be flagged for manual inspection by a human, such as a specialist at a map data services provider that provides the map database 108. The methods provided herein provide a relatively low-cost and highly efficient manner of verifying and/or updating road map geometry based on probe data. The methods described herein do not rely on a "true car" (e.g., a known-entity with accurate/reliable probe data) to identify poorly mapped roads or for users to report map errors.

Methods that automatically or semi-automatically identify potential errors in digital map data may be prone to false positives (e.g., identifying errors that are not present) or alternatively, false negatives (e.g., failing to catch errors that are present). One significant contributor to false positives stems from poor quality probe data relative to the location of the probe data points. The poor quality of probe data may stem from GPS data that is compromised by environmental factors, such as "urban canyons" in dense urban environments, tree covered roads, geological formations, etc. These factors can lead to poor location establishment by the probe and present a false positive of an error in the link segment location in the digital map data. Methods described herein statistically separate actual map errors from errors due to poor location data and consequently more accurately identify map regions where actual digital map data errors are present as opposed to poor location data errors.

Methods described herein may be performed periodically, such as monthly, weekly, daily, etc., depending upon how much probe data is needed to perform statistically significant analysis, and based upon the frequency with which digital map data may change. The methods may not only identify digital map data errors, but also cases in which the road geometry changes in time, such as when roads shift due to construction, roads are closed or opened, or intersections are replaced with roundabouts, etc.

For each probe data point, two measurements are established and used to factor in to the analysis of methods disclosed herein. The measurements include: the perpendicular signed distance, d, between the probe data point location (established, for example, by GPS) and the map-matched position in the digital map data; and the signed difference, h, between the heading of the probe data point and the heading of the map-matched position in the digital map data. The signed distance or displacement, d, may be defined as positive (negative) if the probe data point location is to the right (left) hand side of the map-matched position of the link map data in the digital map data with respect to the traffic direction. The signed heading difference, h, may be defined as positive (negative) if the probe data point heading is in a direction shifted clockwise (counter-clockwise) with respect to the heading of the map-matched link segment. Any unit of measure may be used for the distance and the heading, provided units are consistent or normalized.

FIG. 8 depicts the measurement of the heading between the probe data point heading and the corresponding map-matched link segment for a collection of probe data points that are map matched to the same link segment. The y-axis illustrates the measurement, in degrees, between the probe data point and the corresponding map-matched link segment, while the x-axis illustrates the factor speed of the associated probe data point plays in the heading error. The plot includes logarithmic data points, with the points along the x-axis at zero on the y-axis representing many probe data points, while the darker points further from zero on the y-axis each represent fewer probe data points. This illustration depicts a substantially symmetrical distribution around a heading error of zero, indicating that the probe data point headings match relatively well with the corresponding map-matched link segment heading. Further, as speed of the probe data points increases, the distribution of the probe data points is reduced indicating higher speeds are more consistent in returning a heading measurement, while probe data point heading at low speeds produces a higher error and wider distribution.

As the distribution of difference between probe data point heading values and the heading of the map-matched link segment is centered about zero degrees, it is reasonable to conclude that the heading of the map-matched link segment is accurate and consistent with probe data points representing vehicular traffic.

FIG. 9 illustrates the idealized difference between heading values for probe data points and the corresponding map-matched link segment at different values of speed. The curve at 550 represents speed values of 150 kilometers per hour (kph), while the curve at 552 represents speed values of 30 kph, the curve of 554 represents speed values of 10 kph, and the curve at 556 represents speed values of one kph. The widths of these idealized distributions are obtained by calculating the standard deviations of the differences in heading as a function of speed.

If a map-matched link segment correctly describes the physical road associated therewith, the heading (h-) and distance (d-) distributions are both centered at zero. In this case, the mean of the distributions is statistically consistent with zero. A statistical test would require that the shift of the mean, $\Delta_{mean}$, is smaller than some biasing factor, F, multiplied by the error on the mean of the distribution $\sigma_{mean}$.

$$\frac{\Delta_{mean}}{\sigma_{mean}} < F \tag{1}$$

The error on the mean can be calculated as:

$$\sigma_{mean} = \frac{SD}{\text{Sqrt}(N)} \tag{2}$$

Where SD is the standard deviation of the distribution, and Sqrt(N) is the square-root of the sample size N.

In some instances, the link segment may not accurately describe the physical road, such that either the h-distribution and/or the d-distribution are shifted with respect to zero. For example, if the link segment is shifted to the left with respect to the true road location (relative to the direction of travel), then the d-distribution is shifted to the right by an equal amount. If the link segment heading is shifted with respect to the true road direction, then the h-distribution is shifted in the opposite direction by the same amounts. However, a mere non-zero distribution does not itself conclusively discern that the link segment does not accurately describe the physical road. As detailed above, GPS location data can be erroneous due to environmental factors or device issues, such that false-positive data suggesting a link segment that does not accurately describe the physical road are possible. In order to minimize false-positives, or to balance false-positives against false-negatives, the biasing factor can be used. Identifying a statistically significant shift could require:

$$\frac{\Delta_{mean}}{\sigma_{mean}} > F \tag{3}$$

For h-, d-, or both h- and d-distributions the above formula can be used. The factor F controls the trade-off between false positives (cases identified as map errors where there is no actual map error) and false negatives (missed map errors). A large value for F would select only cases in which the deviation, $\Delta_{mean}$, is highly significant from a statistical point of view, leading to a relatively smaller fraction of false positives, but a relatively larger sample of false negatives. Conversely, a smaller value of F would lead to a relatively larger fraction of false positives, and a relatively smaller fraction of false negatives.

According to an example embodiment, a value of one for F, which corresponds to a "one sigma" confidence level, would lead, in the normal approximation, to 31.73% false positives. A value of three for F would lead to a fraction of 0.27% in normal approximation. However, the normal approximation does not hold exactly as locationing errors are likely not Gaussian. The normal approximation can generally be used to guide determination of the optimal value of F given a set of requirements for the map developer. For example, if a developer requires only that the most probable deviations be flagged for manual review, the threshold value of F can be increased to a large value such that only the most extreme outliers are analyzed manually. This may be desirable when the resources available to review the flagged map issues are finite. Typically, using an F value of three would result in a false positive of around 0.3% or lower.

If a map developer or entity responsible for the accuracy of digital map data has a large amount of resources available to review potential map errors flagged for manual review, the value of F could be lowered, to a value of one, for example. This would lead to a false positive rate of approximately 30%. This may be advantageous in early map development where errors are likely. Further refinement of statistical definitions of shift significance may be developed based on an observed shape of the h- and d-distributions such that reliance upon a normal distribution may be avoided, which may improve accuracy. For example, bootstrapping techniques may be used to evaluate confidence intervals. Statistically defining the significance of the shift of the probe point location data from the link segment location in the digital map provides a reliable and efficient manner of evaluating potential errors in digital map data with respect to the position of an actual link segment or road geographically. Link segments in digital map data that exhibit statistically significant shifts are flagged for manual review. The threshold of statistical significance, such as the factor F, can be fine-tuned to achieve an optimal balance between the number of false positives and the number of missed opportunities for correction. If F is very large, relatively, then only the most extreme link segment shifts would be flagged for manual review such that the fraction of false positives is small. In such a case, there would be real errors in the digital map data that would not be flagged for manual review. If F is very small, even the slightest shift of probe data point location mean versus link segment location would be flagged for manual review, ensuring that no link segment with even slight deviations is left unexamined. However, this would also lead to many false-positives.

For a given probe data point location, the difference between the probe data point heading or location and the link segment heading or location in the digital map data has two components. A first component is the difference $h_1$ or $d_1$ between the probe data point heading or position and the true heading or position of the physical road. This component may be considered a "measurement error" as described above as it is the difference between where a probe actually is, and where a probe's locationing method (e.g., GPS) indicates the probe is located. The second component is the difference $h_2$ or $d_2$ between the true heading or position of the physical road, and the heading or position of the corresponding link segment in the digital map data. The total differences can be written as follows:

$$d = d_1 + d_2 \quad (4)$$

$$h = h_1 + h_2 \quad (5)$$

Each of $h_1$, $h_2$ $d_1$, and $d_2$ are signed quantities, which can be either positive or negative.

While the probe data point heading/location difference from the map-matched link segment in the digital map data has two components, the component of primary interest is the difference between the true road heading/position and the link segment heading/position. This component cannot be readily obtained, but can be inferred through methods described herein. From the probe data point headings/locations for a given link segment, the distributions of h and d can be constructed.

There are four primary scenarios in which probe data point information is gathered and compared against map-matched link segment data. In a first scenario of ideal locationing (e.g., GPS) conditions, such as clear sky, no obstructing trees/buildings, and a perfect map representation of the road in the digital map data (e.g., $h_2=0$ and $d_2=0$), the h and d distributions are centered at zero and have a typical locationing accuracy distribution. In a typical GPS locationing scenario, a width of five to ten meters may be the spread of position data, while the width of the heading distribution may be probe speed dependent. In a second scenario, unfavorable locationing conditions may be present, such as buildings, trees, overcast skies, etc., but a correct map representation of the physical road is present in the digital map data (e.g., $h_2=0$ and $d_2=0$), and the h and d distributions may be shifted with respect to zero and have large standard deviations. In a third scenario, there are favorable locationing conditions, but a poor map representation of the physical road in the digital map data. The h and d distributions may have the typical narrow widths due to favorable locationing, but the means are shifted with respect to zero. In the fourth scenario, having both poor locationing conditions and a poor map representation of the physical road in the digital map data, the h and d distributions are both wider than typical locationing widths (e.g., 5-10 meters for GPS), and the mean is also shifted relative to zero.

For segments where the h and d distributions are not significantly shifted from zero (the first scenario above), there is no reason to flag the segments for manual review. On the contrary, the segments for which the h and d distributions are significantly shifted (such as in the second, third, and fourth scenarios above) should be flagged for manual review based on a value of the threshold F tuned according to the business needs as described above. Manual review would typically discard cases triggered by urban canyons (dense urban cityscapes) and focus on correcting actual map data errors. In some cases, maps of unfavorable locationing conditions can be overlaid to provide an indication of the likelihood of probe data points from a certain location falling into the second scenario above. This may provide an additional level of automation to reduce the volume of potential digital map errors that are flagged for manual review.

Additional refinement of the probe data points and link segment data may also be used to further enhance the efficiency of digital map data updating/verifying. A probability density function can be approximated by a normal distribution with a speed dependent width for the heading (h) distribution. A similar distribution without the speed dependent width can be used for the location (d) distribution. These probability density functions can be represented by P(h) and P(d). In the below equations, $P(h_1)$, $P(h_2)$, $P(d_1)$, and $P(d_2)$ are the probability density functions corresponding to $h_1$, $h_2$ $d_1$, and $d_2$ respectively of equations (4) and (5) above. The probability densities P(h) and P(d) can be written as convolutions of $P(h_1)$ with $P(h_2)$ and $P(d_1)$ with $P(d_2)$, respectively.

$$P(h) = P(h_1)(x)P(h_2) \quad (6)$$

$$P(d) = P(d_1)(x)P(d_2) \quad (7)$$

Where (x) denotes the convolution symbol. For any link segment, the probability densities P(h) and P(d) can be inferred from data as illustrated in FIG. 8. Additionally, the probability densities $P(h_1)$ and $P(d_1)$ can be obtained as described above with respect to locationing data uncertainty. Once $P(h)$, $P(d)$, $P(h_1)$, and $P(d_1)$ are known, $P(h_2)$ and $P(d_2)$ can be solved for using Fourier analysis.

$$P(h_2)=F^{-1}[F[P(h)]/F[P(h_1)]] \quad (8)$$

$$P(d_2)=F^{-1}[F[P(d)]/F[P(d_1)]] \quad (9)$$

Where F and $F^{-1}$ are the Fourier and inverse Fourier transforms, respectively.

For each link segment in the digital map data, the probability density functions $P(h_2)$ and $P(d_2)$ represent pure digital map data errors without locationing uncertainties (removed using equations (8) and (9)). If these probability density functions are significantly shifted from zero, according to the F threshold described above, then the corresponding segments can be reliably flagged for manual review as potentially erroneous digital map data.

FIG. 10 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 10 illustrates a flowchart of a method according to an example embodiment of the present invention. Probe data may be received from a plurality of probes within a predefined geographic region at 610. The probe data is map-matched to a link segment that is data of a digital map representative of a physical road, to generate map-matched probe data at 620. A difference between the heading information and/or location information on the map-matched probe data and the link segment is calculated at 630. A statistical mean of the difference between the heading information and/or location information of the probe data and the link segment is determined at 640. An error of the statistical mean is calculated and determined at 650. If the statistical mean of the difference between the heading and/or location information of the map-matched probe data points and the link segment is greater than the error of the statistical mean multiplied by a biasing factor, the link segment is flagged for manual review at 660.

In an example embodiment, an apparatus for performing the method of FIG. 10 may comprise a processor (e.g., the processor 202) configured to perform some or each of the operations (610-660) described above. The processor may, for example, be configured to perform the operations (610-660) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-660 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A map services provider system comprising:
   a communications interface configured to receive probe data points from a plurality of probes, wherein the probe data comprises at least one of heading information and location information for each probe data point, and
   at least one processor configured to:
   match the probe data to a link segment to generate map-matched probe data;
   calculate a difference between the at least one of heading information and location information of the map-matched probe data points and of the link segment;
   determine a statistical mean of the difference between the at least one of heading information and location information of the map-matched probe data points and the link segment;
   determine an error of the statistical mean of the difference between the at least one of heading information and location information of the map-matched probe data points and the link segment; and flag the link segment for manual review in response to the statistical mean of the difference between the at least one of heading information and location information of the map-matched probe data points and the link segment being greater than the error of the statistical mean multiplied by a biasing factor.

2. A map services provider system according to claim 1, wherein the probe data comprises location information for each probe data point, and wherein causing the processor to calculate a difference between the at least one of heading information and location information of the map-matched probe data points and of the link segment comprises causing the processor to calculate a distance between the location information for each probe data point and the link segment.

3. A map services provider system according to claim 2, wherein causing the processor to determine a statistical mean of the difference between the at least one of heading information and location information of the map-matched probe data points and the link segment comprises causing the processor to determine a statistical mean of the distance between the map-matched probe data points and the link segment.

4. A map services provider system according to claim 1, wherein the error of the statistical mean is calculated by:
   determining the standard deviation of the difference between the at least one of heading information and location information of the map-matched probe data points and the link segment; and
   dividing the standard deviation by a square root of a number of probe data points map-matched to the link segment.

5. A map services provider system according to claim 1, wherein the processor is further configured to:
   add the link segment to a queue for review in response to the link segment being flagged for manual review;
   provide for presentation of digital map data associated with the link segment;
   provide for presentation of map-matched probe data matched to the link segment; and
   provide for updating the digital map data associated with the link segment to reflect the map-matched probe data in response to a user input.

6. A map services provider system according to claim 1, wherein the difference between the at least one of heading information and location information of the map-matched probe data points and the link segment comprises a first component and a second component, wherein the first component is a locationing accuracy component, wherein the second component is a true difference between map data associated with the link segment and a true location of a road segment associated with the link segment; wherein the processor is further configured to:
   calculate a first probability density of a combination of the first component and the second component;
   calculate a second probability density of the first component; and
   perform a Fourier analysis of the first probability density and the second probability density to obtain a probability density of the second component.

7. A map services provider system according to claim 6, wherein the processor configured to calculate the first probability density of a combination of the first component and the second component comprises calculating a probability density of the difference between the at least one of heading information and location information of the map-matched probe data points and of the link segment, and wherein the processor configured to calculate the second probability density comprises calculating a probability density based on measurement errors of the probe data points.

8. An apparatus comprising at least one processor and at least one memory including computer program code, the at least one memory and computer program code configured to, with the processor, cause the apparatus to at least:
   receive probe data from a plurality of probes within a region, wherein the probe data comprises at least one of heading information and location information for each probe data point;
   match the probe data to a link segment to generate map-matched probe data;
   calculate a difference between the at least one of heading information and location information of the map-matched probe data points and of the link segment;
   determine a statistical mean of the difference between the at least one of heading information and location information of the map-matched probe data points and the link segment;
   determine an error of the statistical mean of the difference between the at least one of heading information and location information of the map-matched probe data points and the link segment; and
   flag the link segment for manual review in response to the statistical mean of the difference between the at least one of heading information and location information of the map-matched probe data points and the link segment being greater than the error of the statistical mean multiplied by a biasing factor.

9. An apparatus according to claim 8, wherein the probe data comprises location information for each probe data point, and wherein causing the processor to calculate a difference between the at least one of heading information and location information of the map-matched probe data points and of the link segment comprises causing the processor to calculate a distance between the location information for each probe data point and the link segment.

10. An apparatus according to claim 9, wherein causing the apparatus to determine a statistical mean of the difference between the at least one of heading information and location information of the map-matched probe data points and the link segment comprises causing the apparatus to determine a statistical mean of the distance between the map-matched probe data points and the link segment.

11. An apparatus according to claim 8, wherein the error of the statistical mean is calculated by:
   determining the standard deviation of the difference between the at least one of heading information and location information of the map-matched probe data points and the link segment; and
   dividing the standard deviation by a square root of a number of probe data points map-matched to the link segment.

12. An apparatus according to claim 1, wherein the apparatus is further configured to:
   add the link segment to a queue for review in response to the link segment being flagged for manual review;
   provide for presentation of digital map data associated with the link segment;
   provide for presentation of map-matched probe data matched to the link segment; and
   provide for updating the digital map data associated with the link segment to reflect the map-matched probe data in response to a user input.

13. An apparatus according to claim 8, wherein the difference between the at least one of heading information and location information of the map-matched probe data points and the link segment comprises a first component and a second component, wherein the first component is a locationing accuracy component, wherein the second component is a true difference between map data associated with the link segment and a true location of a road segment associated with the link segment; wherein the apparatus is further configured to:
 calculate a first probability density of a combination of the first component and the second component;
 calculate a second probability density of the first component; and
 perform a Fourier analysis of the first probability density and the second probability density to obtain the probability density of the second component.

14. An apparatus according to claim 13, wherein the apparatus configured to calculate the first probability density of a combination of the first component and the second component comprises calculating a probability density of the difference between the at least one of heading information and location information of the map-matched probe data points and of the link segment, and wherein the processor configured to calculate the second probability density comprises calculating a probability density based on measurement errors of the probe data points.

15. A method comprising:
 receiving probe data from a plurality of probes within a region, wherein the probe data comprises at least one of heading information and location information for each probe data point;
 matching the probe data to a link segment to generate map-matched probe data;
 calculating a difference between the at least one of heading information and location information of the map-matched probe data points and of the link segment;
 determining a statistical mean of the difference between the at least one of heading information and location information of the map-matched probe data points and the link segment;
 determining an error of the statistical mean of the difference between the at least one of heading information and location information of the map-matched probe data points and the link segment; and
 flagging the link segment for manual review in response to the statistical mean of the difference between the at least one of heading information and location information of the map-matched probe data points and the link segment being greater than the error of the statistical mean multiplied by a biasing factor.

16. A method according to claim 15, wherein the probe data comprises location information for each probe data point, and wherein calculating a difference between the at least one of heading information and location information of the map-matched probe data points and of the link segment comprises calculating a distance between the location information for each probe data point and the link segment.

17. A method according to claim 16, wherein determining a statistical mean of the difference between the at least one of heading information and location information of the map-matched probe data points and the link segment comprises determining a statistical mean of the distance between the map-matched probe data points and the link segment.

18. A method according to claim 15, wherein the error of the statistical mean is calculated by:
 determining the standard deviation of the difference between the at least one of heading information and location information of the map-matched probe data points and the link segment; and
 dividing the standard deviation by a square root of a number of probe data points map-matched to the link segment.

19. A method according to claim 5, further comprising:
 adding the link segment to a queue for review in response to the link segment being flagged for manual review;
 providing for presentation of digital map data associated with the link segment;
 providing for presentation of map-matched probe data matched to the link segment; and
 updating the digital map data associated with the link segment to reflect the map-matched probe data in response to a user input.

20. A method according to claim 15, wherein the difference between the at least one of heading information and location information of the map-matched probe data points and the link segment comprises a first component and a second component, wherein the first component is a locationing accuracy component, wherein the second component is a true difference between map data associated with the link segment and a true location of a road segment associated with the link segment; the method further comprising:
 calculating a first probability density of a combination of the first component and the second component;
 calculating a second probability density of the first component; and
 performing a Fourier analysis of the first probability density and the second probability density to obtain the probability density of the second component.

21. A method according to claim 20, wherein calculating the first probability density of a combination of the first component and the second component comprises calculating a probability density of the difference between the at least one of heading information and location information of the map-matched probe data points and of the link segment, and wherein calculating the second probability density comprises calculating a probability density based on measurement errors of the probe data points.

22. A computer program product comprising at least one non-transitory computer-readable storage medium having computer-executable program code portions stored therein, the computer-executable program code portions comprising program code instructions configured to:
 receive probe data from a plurality of probes within a region, wherein the probe data comprises at least one of heading information and location information for each probe data point;
 match the probe data to a link segment to generate map-matched probe data;
 calculate a difference between the at least one of heading information and location information of the map-matched probe data points and of the link segment;
 determine a statistical mean of the difference between the at least one of heading information and location information of the map-matched probe data points and the link segment;
 determine an error of the statistical mean of the difference between the at least one of heading information and location information of the map-matched probe data points and the link segment; and flag the link segment for manual review in response to the statistical mean of the difference between the at least one of heading information and location information of the map-matched probe data points and the link segment being greater than the error of the statistical mean multiplied by a biasing factor.

23. A computer program product according to claim 22, wherein the probe data comprises location information for each probe data point, and wherein causing the processor to calculate a difference between the at least one of heading information and location information of the map-matched probe data points and of the link segment comprises causing the processor to calculate a distance between the location information for each probe data point and the link segment.

24. A computer program product according to claim 23, wherein the program code instructions to determine a statistical mean of the difference between the at least one of heading information and location information of the map-matched probe data points and the link segment comprise program code instructions to cause the processor to determine a statistical mean of the distance between the map-matched probe data points and the link segment.

25. A computer program product according to claim 22, wherein the program code instructions to calculate the error of the statistical mean comprises program code instructions to:
   determine the standard deviation of the difference between the at least one of heading information and location information of the map-matched probe data points and the link segment; and
   divide the standard deviation by a square root of a number of probe data points map-matched to the link segment.

26. A computer program product according to claim 22, further comprising program code instructions to:
   add the link segment to a queue for review in response to the link segment being flagged for manual review;
   provide for presentation of digital map data associated with the link segment;
   provide for presentation of map-matched probe data matched to the link segment; and
   provide for updating the digital map data associated with the link segment to reflect the map-matched probe data in response to a user input.

\* \* \* \* \*

UNITED STATES PATENT AND TRADEMARK OFFICE
CERTIFICATE OF CORRECTION

PATENT NO. : 11,386,068 B2
APPLICATION NO. : 15/336267
DATED : July 12, 2022
INVENTOR(S) : Gavril Giurgiu and Alex Averbuch It is certified that error appears in the above-identified patent and that said Letters Patent is hereby corrected as shown below:

In the Claims

At Claim 12, Column 26, Line 57, delete "claim 1" and insert -- claim 8 --, therefor.

At Claim 19, Column 28, Line 8, delete "claim 5" and insert -- claim 15 --, therefor.

Signed and Sealed this
Twenty-fifth Day of July, 2023

Katherine Kelly Vidal
*Director of the United States Patent and Trademark Office*